Nov. 18, 1941.  P. COSTANTINO  2,262,886
PUZZLE
Filed Feb. 20, 1941  2 Sheets-Sheet 1

Inventor
Paul Costantino

By Clarence A. O'Brien
Attorney

Nov. 18, 1941.  P. COSTANTINO  2,262,886
PUZZLE
Filed Feb. 20, 1941  2 Sheets-Sheet 2

Inventor
Paul Costantino

By Clarence A. O'Brien

Attorney

Patented Nov. 18, 1941

2,262,886

UNITED STATES PATENT OFFICE 2,262,886

PUZZLE

Paul Costantino, New York, N. Y.

Application February 20, 1941, Serial No. 379,885

1 Claim. (Cl. 273—109)

This invention relates to puzzles and has for the primary object the provision of a device of this character which will be educational as well as being extremely amusing to both children and adults alike and will be simple in construction, durable and compact and may be manufactured and sold at a low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a puzzle constructed in accordance with my invention and showing the plurality of blocks distributed over the bottom wall of the receptacle.

Figure 1:
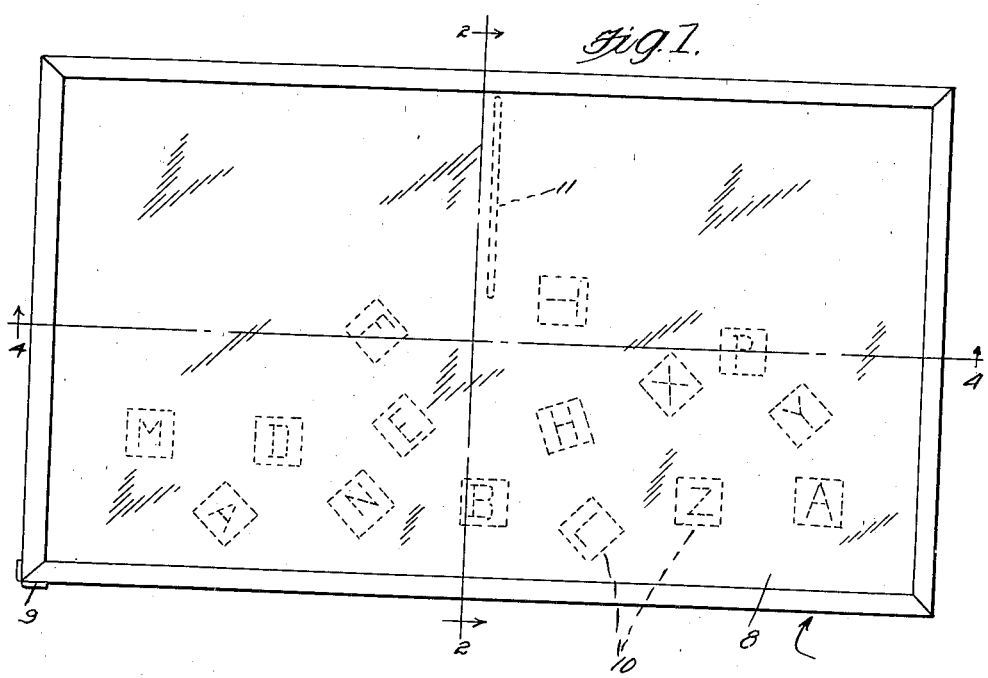
Figure 2:
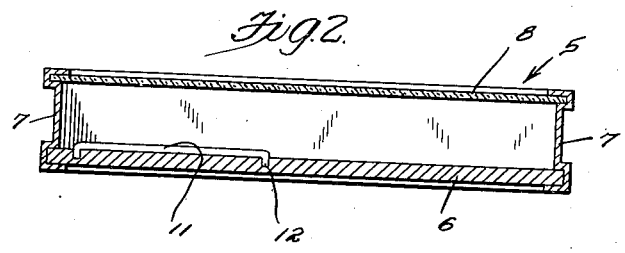
Figure 2 is a transverse sectional view taken on the line 2—2 of Figure 1.

Referring in detail to the drawings, the numeral 5 indicates a receptacle of a shallow depth and of substantially rectangular shape. The receptacle includes a bottom wall 6, upstanding walls 7 and a top or cover 8 of transparent material. The upstanding walls are channeled or grooved to receive the edges of the bottom and top walls forming in the outer faces of said upstanding walls exterior channels.

It is preferable that the upstanding walls be constructed of a single length of material which after being bent to form the upstanding walls at right angles to each other, the ends of the material at one corner of the receptacle are detachably connected by tongues 9 extending through slots and clinched.

Figure 6:
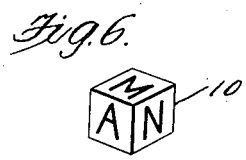
Figure 6 is a perspective view illustrating one of the blocks.
Figure 7:
Figure 7 is a perspective view illustrating a trip element located upon the surface of the bottom wall of the puzzle.
Figure 3:
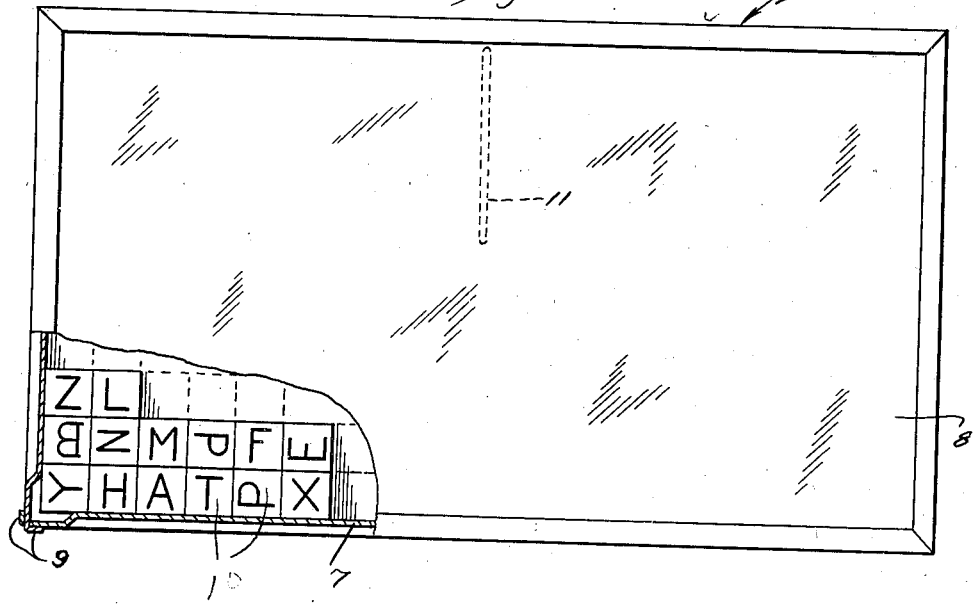
Figure 3 is a top plan view partly broken away and in section showing the grouping of the blocks so as to spell words.
Figure 4:
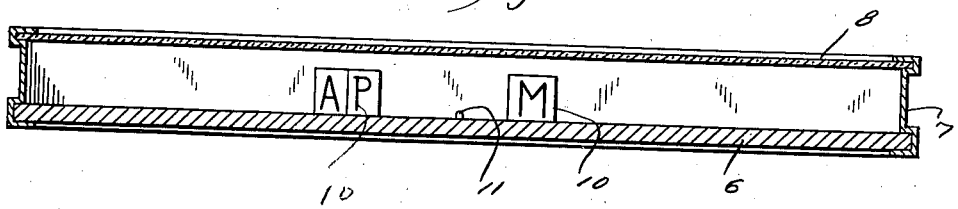
Figure 4 is a sectional view taken on the line 4—4 of Figure 1.
Figure 5:
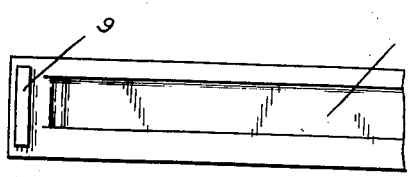
Figure 5 is a fragmentary edge elevation showing the construction of one of the vertical walls and the means of connecting the same to adjacent vertical walls.

A plurality of blocks 10 of rectangular shape presenting flat faces are arranged within the receptacle 5 for movement over the bottom wall. Letters or other characters, as shown in Figure 6, are applied in any suitable way to the faces of the blocks. The purpose of the blocks and the letters or characters thereon is to permit a person to solve the puzzle or to work out the spelling of words by shifting the blocks relative to each other over the top face of the bottom wall. The sliding of the blocks over the top face of the bottom wall may be accomplished by tilting the receptacle from a horizontal position so that the blocks can be aligned in rows as shown in Figure 3 and the characters disposed uppermost read either horizontally or transversely for the purpose of spelling words.

A trip element 11 is secured on the bottom wall and is in the form of a rod having angularly related ends 12 which are embedded in the bottom wall so that the major portion of the rod lies upon the top surface of the bottom. The trip element is positioned on the bottom wall, as shown in Figure 3, that is intermediate the ends of the receptacle and upon one side leaving the other side of the bottom wall unobstructed over which the blocks may slide smoothly. However, when the receptacle is tilted to bring the blocks onto the side where the trip element 11 is located and then tilting the receptacle from end to end the blocks will be caused to catch against the trip element and caused to roll over presenting another face uppermost. Therefore, in order for a person to solve the puzzle it is necessary that the person work out how it is possible to cause the blocks to turn over to bring another face uppermost and after the blocks have been shifted or rolled over they are slid to the opposite side of the receptacle into rows so that the characters thereon will spell words read either transversely or longitudinally of the receptacle.

While I have shown and described the preferred embodiment of my invention, it will be understood that minor changes in construction, combination and arrangement of parts may be made without departing from the spirit and scope of the invention as claimed.

Having thus described my invention, what I claim is:

In a puzzle, a shallow rectangular receptacle having a transparent cover and a plurality of blocks having characters on the faces thereof located in said receptacle and movable therein by tilting the receptacle in different directions to shift the blocks relative to each other for the purpose of spelling words or the like, the size of the blocks and the depth of the receptacle being such that the blocks will be prevented from readily turning over to present other surfaces uppermost, and a trip rod on the bottom of the receptacle which when engaged by blocks moving against the same will cause said blocks to turn over, said rod extending part way across the bottom in the approximate transverse center thereof from a point closely adjacent one side of the receptacle to provide for the blocks being moved around one end of the rod to be engaged with opposite sides of the same under tilting of the receptacle in opposite directions.

PAUL COSTANTINO.